United States Patent
Tao et al.

(10) Patent No.: US 8,276,462 B2
(45) Date of Patent: Oct. 2, 2012

(54) FIBER STRAIN SENSOR AND MEASUREMENT SYSTEM FOR REPEATED LARGE DEFORMATION

(75) Inventors: Xiao-Ming Tao, Hong Kong (HK); Wei Zheng, Hong Kong (HK); Xiao-Hong Sun, Hong Kong (HK); Guang-Feng Wang, Hong Kong (HK); Chi-Yuen Hui, Hong Kong (HK)

(73) Assignee: Hong Kong Research Institute of Textiles and Apparel, Kowloon (HK)

( * ) Notice: Subject to any disclaimer, the term of this patent is extended or adjusted under 35 U.S.C. 154(b) by 345 days.

(21) Appl. No.: 12/795,739

(22) Filed: Jun. 8, 2010

(65) Prior Publication Data
US 2010/0313668 A1 Dec. 16, 2010

Related U.S. Application Data

(60) Provisional application No. 61/213,451, filed on Jun. 10, 2009.

(51) Int. Cl.
 *G01L 1/24* (2006.01)
 *G02B 6/00* (2006.01)
 *G01B 11/16* (2006.01)
(52) U.S. Cl. ............................. 73/800; 385/13; 356/32
(58) Field of Classification Search ........................ None
See application file for complete search history.

(56) References Cited

U.S. PATENT DOCUMENTS

| | | | |
|---|---|---|---|
| 4,770,492 A * | 9/1988 | Levin et al. | 385/13 |
| 5,627,637 A * | 5/1997 | Kapteyn | 356/32 |
| 5,900,556 A | 5/1999 | Ahmad et al. | |
| 7,911,622 B2 * | 3/2011 | Terrel et al. | 356/477 |
| 2006/0104561 A1* | 5/2006 | Ivtsenkov | 385/13 |
| 2009/0092352 A1* | 4/2009 | Ng et al. | 385/13 |
| 2009/0252451 A1* | 10/2009 | Lagakos et al. | 385/13 |
| 2012/0086934 A1* | 4/2012 | Digonnet et al. | 356/32 |

FOREIGN PATENT DOCUMENTS

| | | | |
|---|---|---|---|
| JP | 09014927 A | * | 1/1997 |
| JP | 11101617 A | * | 4/1999 |
| WO | WO-94/29671 | | 12/1994 |

OTHER PUBLICATIONS

Guenther Gauglitz, Direct optical sensors: principles and selected applications, Anal Bioanal Chem. 381: 141-155, 2005.

Daniel Gallego et al., High-sensitivity ultrasound interferometric single-mode polymeroptical fiber sensors for biomedical application, Opt. Lett.34(12)1807-1809, 2009.

(Continued)

*Primary Examiner* — Andre Allen
(74) *Attorney, Agent, or Firm* — Muncy, Geissler, Olds & Lowe, PLLC (57) ABSTRACT

A measurement system (10) for detecting repeated large deformation comprising: a fiber optical strain sensor (12) including a flexible polymer optical fiber (POF) (20) in the form of a series of extended loops (40), the loops (40) being flexible to allow rotation in the plane; and notches (41) formed on at least one side of the fiber (20); a light source (11) connected to the POF (20); and a photo-detector (13) to detect a change of the light power transmission loss through the notches (41) caused by the alteration of the shape of the notches (41) when the strain sensor (12) is strained.

13 Claims, 12 Drawing Sheets

OTHER PUBLICATIONS

H.Y. Liu et al., Thermal stability of gratings in PMMA and CYTOP polymer fibers, Optics Communications, 204:151-156, 2002.

C. Saunders et al., Sensing applications for POF and hybrid fibres using a photon counting OTDR, Meas. Sci. Technol. 18(3):615-622, 2007.

A. Babchenko et al., Graded-index plastic optical fiber for deformation sensing, Optics and Lasers in Engineering. 45(7): 757-760, 2007.

K.S.C. Kuang et al., Assessment of an extrinsic polymer-based optical fibre sensor for structural health monitoring, Measurement Science and Technology. 15(10): 2133-2141, 2004.

K.S.C. Kuang et al., An application of a plastic optical fiber sensor and genetic algorithm for structural health monitoring, Journal of Intelligent Material Systems and Structures. 17(5):361-379, 2006.

A. Babchenko et al., Plastic optical fibre with structural imperfections as a displacement sensor, Meas. Sci. Technol. 17: 1157-1161, 2006.

A. Babchenko et al., A sensing element based on 3D imperfected polymer optical fibre, Journal of Optics A: Pure and Applied Optics, 9(1): 1-5, 2007.

Anu Vijayan, et al., An optical fiber weighing sensor based on bending, Meas. Sci. Technol. 19:1-8, 2008.

M. Kovacevic et al., Monte Carlo simulation of curvature gauges by ray tracing, Meas. Sci. Technol. 15: 1756-1761, 2004.

M. Kovacevic et al., Analytical Optimization of Optical Fiber Curvature Gauges, IEEE Sensors Journal, 8(3); 227-232, 2008.

* cited by examiner

FIBER STRAIN SENSOR AND MEASUREMENT SYSTEM FOR REPEATED LARGE DEFORMATION

This nonprovisional application claims priority to U.S. provisional application no. 61/213,451, which was filed on Jun. 10, 2009, and which is herein incorporated by reference.

TECHNICAL FIELD

The invention concerns a system, method and fiber optical strain sensor for detecting repeated large deformation.

BACKGROUND OF THE INVENTION

Optical fiber sensors have certain advantages including being unaffected by electromagnetic interference, lightweight, small size, high sensitivity, large bandwidth, and ease in signal light transmission. In recent years, the use of optical fiber sensors for monitoring pressure, strain, displacement, temperature and humidity has become increasingly common.

Three techniques have been applied in the polymer optical fiber (POF) sensor field: interference technology, fiber Bragg diffraction grating (FBG) technology and optical time-domain reflectometry (OTDR). All three techniques are highly sensitive, but they require complex and expensive measurement equipment. Measurements are very sensitive to temperature changes and therefore require complicated compensation techniques. Furthermore, these sensors have a limited strain range for repeated large deformation.

There have been experimental investigations into crack detection and vertical deflection monitoring in concrete beams using POF sensors in which a segment of the cross-sectional profile was deliberately removed in order to enhance the sensing performance.

An optical displacement sensor has been developed based on bending multilooped POFs that has multistructural imperfections on the outer side of its core. The power loss was found to be particularly sensitive to the depth of the increased imperfection.

A macrobending POF has been used for weight measurement. The macrobending POF is used with an inexpensive and simple sensor having intensity modulation. When a plastic optical fiber is fully and rigidly adhered on a metallic cantilever beam, it is sufficiently sensitive for the measurement of force in the form of weight.

A curvature gauge sensor has been modeled by geometric optics. A fraction of power refracted at each of many planes of the serrated sensitive zone was calculated separately. The model enabled visualization of fundamentals involved in the operation of this fiber-optic sensor so that a better qualitative understanding could be gained.

WO 94/29671 discloses a curvature or bending and displacement sensor composed of an initially straight fiber optic or light wave guide. The sensor is for attachment to a member or members being curved or displaced. Curvature of the fiber resulted in macro-bending loss sometimes in conjunction with a superimposed curvature in a plane other than that of the curvature to be measured. This macro-bending loss is detected. The loss of light detection was used to produce indication of curvature or displacement.

U.S. Pat. No. 5,900,556 discloses a helical optical fiber sensor based on macrobending losses. The sensor is embedded in concrete and is used to monitor the deformation (strain) of concrete due to compression, tension, and bending. The material of the helical optical fiber was silicone rubber. The range of the deformation and the sensitivity of the sensor were not disclosed.

SUMMARY OF THE INVENTION

In a first preferred aspect, there is provided a fiber optical strain sensor for detecting repeated large deformation, the sensor comprising:
 a flexible polymer optical fiber (POE) in the form of a series of extended loops, the loops being flexible to allow rotation in the plane;
 notches formed on at least one side of the fiber;
 wherein the amount of strain applied on the strain sensor is measured by detecting a change of the light power transmission loss through the notches caused by the alteration of the shape of the notches when the strain sensor is strained.

The change in light power may be detected by a photo-detector

The quantity and the shape of the notches may be related to axial strain of the sensor.

The notches may be formed on the fiber by any one from the group consisting of: laser ablation, electric beam, hot wire and mechanical cutting.

The notches may be formed on the top or bottom of each loop of the fiber.

The sensor may be attached to an elastic substrate to detect strain applied on the elastic substrate, and the attachment is by any one from the group consisting of: silicon glue, epoxy glue, threads and any combination thereof.

The notches may be "V" shaped, rectangular or circular.

The change in light power may be an increase or decrease relative to the light power prior to the strain sensor being strained.

In a second aspect, there is provided a measurement system for detecting repeated large deformation comprising:
 a fiber optical strain sensor including a flexible polymer optical fiber (POF) in the form of a series of extended loops, the loops being flexible to allow rotation in the plane; and notches formed on at least one side of the fiber;
 a light source connected to the POF; and
 a photo-detector to detect a change of the light power transmission loss through the notches caused by the alteration of the shape of the notches when the strain sensor is strained The strain sensor may be attached to an elastic substrate. The elastic substrate is capable of large repeated deformation without significant amount of force-deformation hysteresis.

The system may further comprise a computer to control the strain applied and display the light power, and to record the change in light power detected by the photo-detector.

The photo-detector may be a fiber optic power meter

In a third aspect, there is provided a method for detecting repeated large deformation, the method comprising:
 detecting a change of the light power transmission loss through notches formed on at least one side of a flexible polymer optical fiber (POF) in the form of a series of extended loops where the loops being flexible to allow rotation in the plane.
 wherein the amount of strain applied on the strain sensor is measured by the detected change of the light power transmission loss through the notches caused by the alteration of the shape of the notches when the strain sensor is strained.

The present invention relates to a fiber optical strain sensor for detecting repeated large deformation. This sensor can be widely used due to its low cost, flexibility, high sensitivity and wide range of measurement.

BRIEF DESCRIPTION OF THE DRAWINGS

An example of the invention will now be described with reference to the accompanying drawings, in which.

DETAILED DESCRIPTION OF THE DRAWINGS

Figure 1:
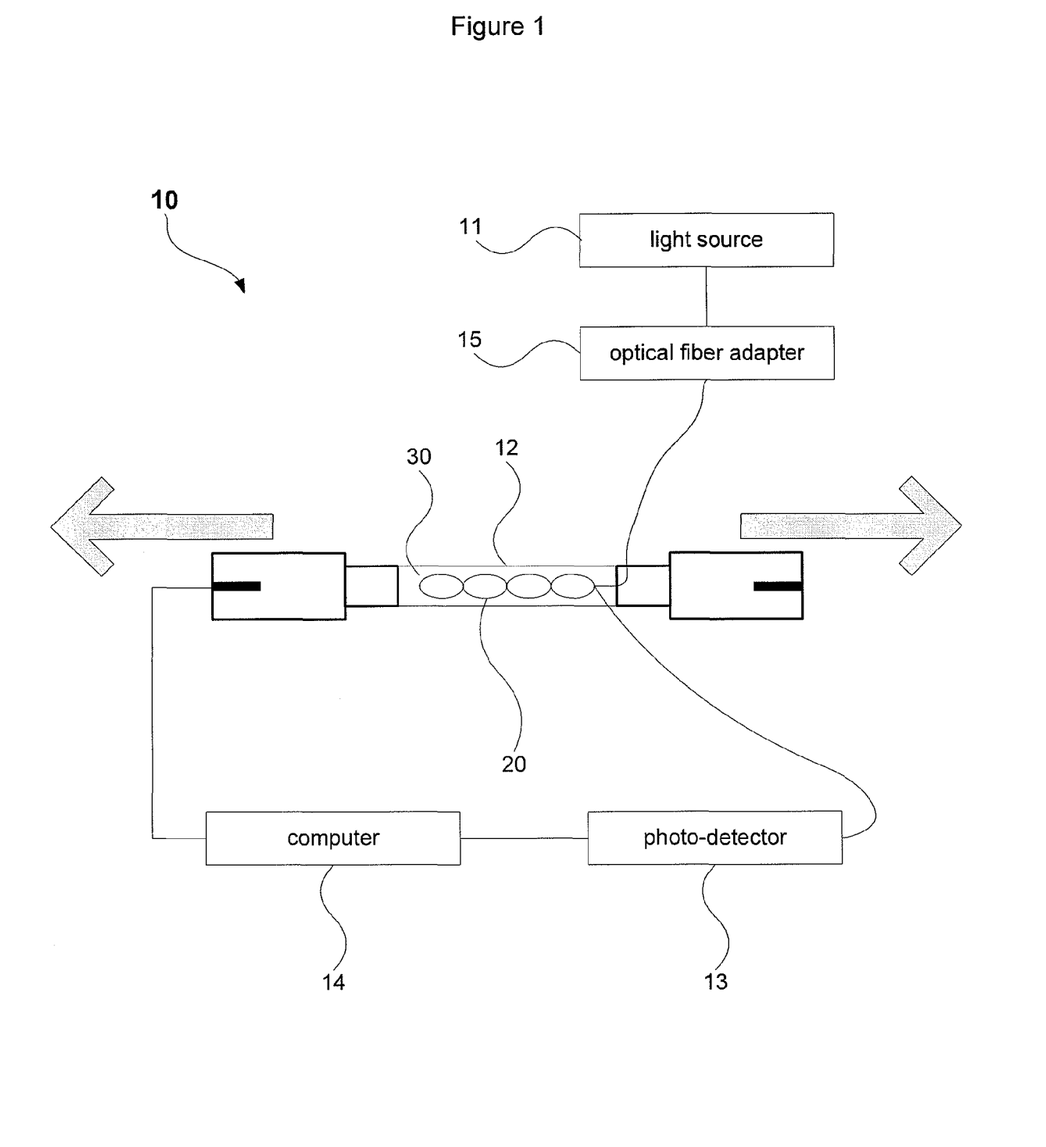
FIG. 1 is a system diagram of a measurement system for measuring repeated large deformation in accordance with an embodiment of the present invention.

Referring to FIG. 1, a measurement system 10 for measuring repeated large deformation is provided. The system 10 generally comprises: a light source 11, a polymer optical fiber (POE) strain sensor 12 (the arrows indicate the direction of external forces) and a photo-detector 13. A computer 14 is used to control the amount of strain applied and display the light power detected by the photo-detector 13. The light source 11 may be a lamp bulb or LED (wavelength is from 390 nm to 1500 nm). Preferably, the light source 11 is directly coupled to the POF 20. The LED 11 emits light onto the POF 20 via an optical fiber adapter 15. Preferably, the photo-detector is a fiber optic power meter 13.

This strain sensor 12 has a wide application in measuring and monitoring strain, movement, large deformation and force for flexible structures. Flexible structures include light-membrane buildings, parachutes, air-bags, geo-textiles and aerospace structures. The strain sensor 12 is able to detect repeated large deformation in engineered structures, machinery and medicine. Other applications include health, medicine, sport, and machine/human interface. For example, it can monitor the patient's breathing rate using Nuclear Magnetic Resonance (NMR) spectroscopy without electromagnetic interference.

Figure 2:
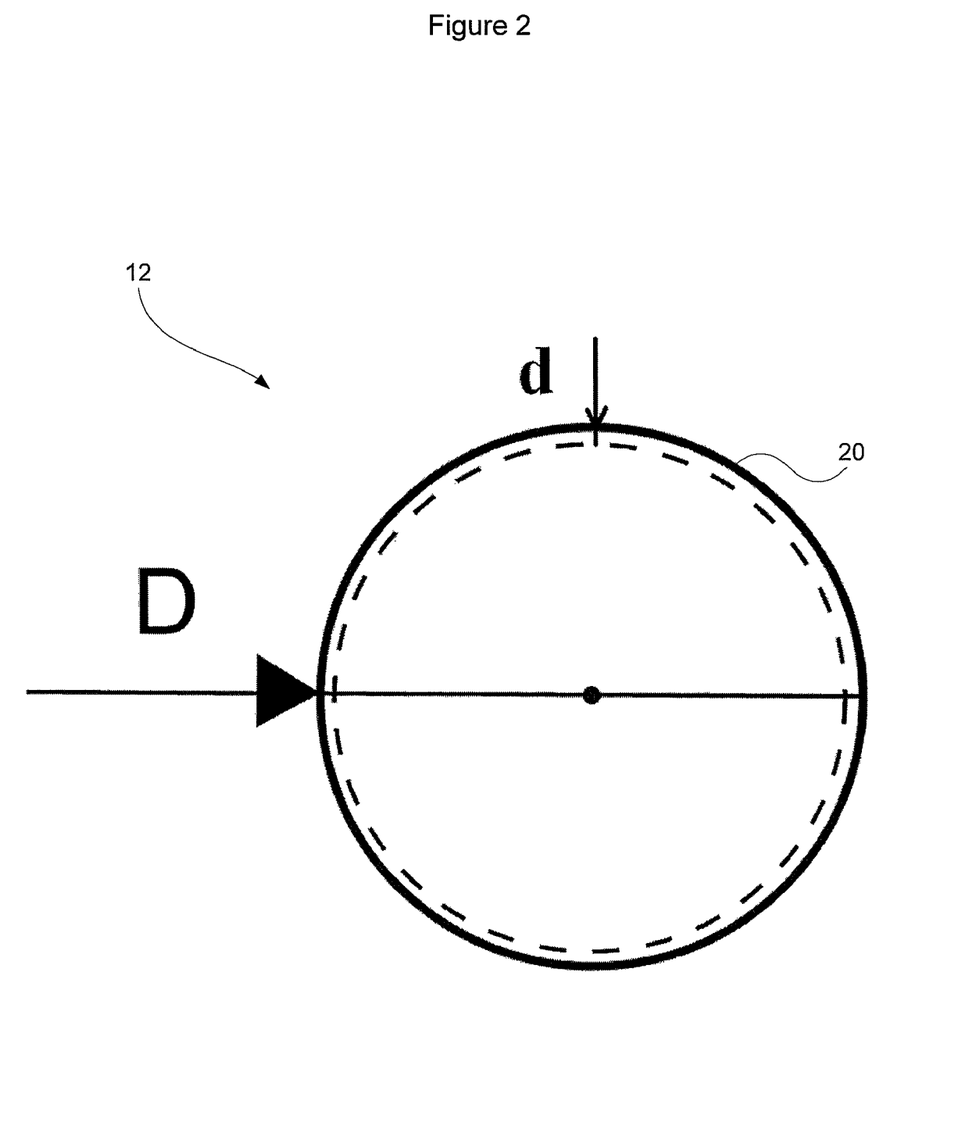
FIG. 2 is a cross-sectional view of the POF sensor in accordance with an embodiment of the present invention.

Referring to FIG. 2, a cross-sectional view of the strain sensor 12 is depicted. D is the diameter of the polymer optical fiber (POE) 20 in the strain sensor 12. The diameter of the POF 20 ranges from 0.1 mm to 3 mm. d is the thickness of the cladding which ranges from 10 μm to 100 μm.

Figure 3:
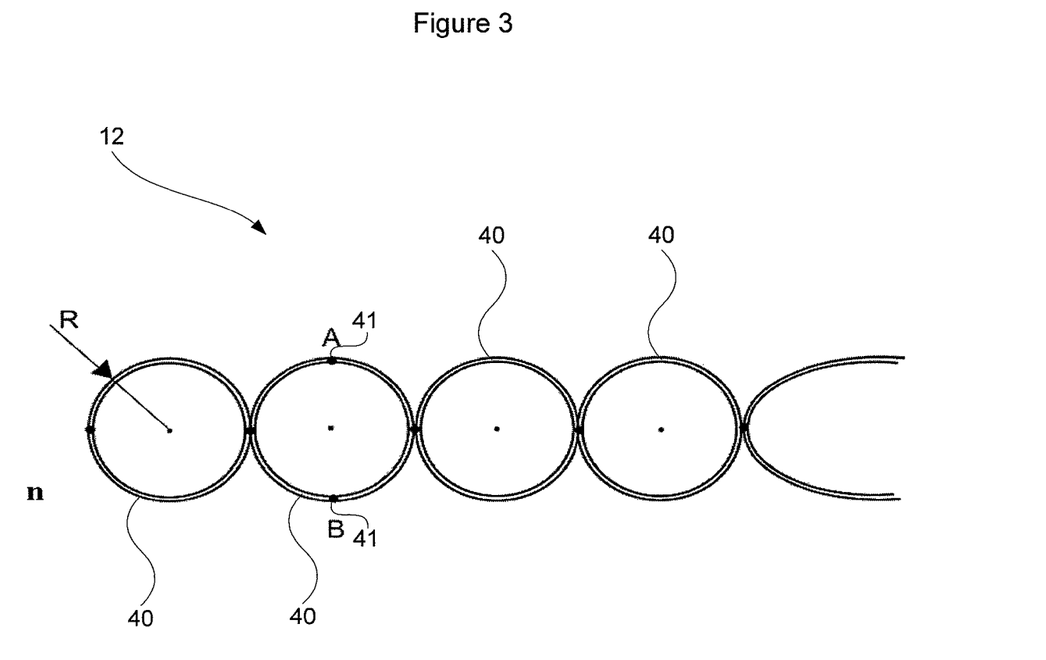
FIG. 3 is a side view of a POF sensor in accordance with an embodiment of the present invention.

Referring to FIG. 3, the strain sensor 12 has a structure defined by a series of loops 40. R is the distance from the centre of a loop 40 to the centre line of the POF 20. The distance R ranges from 5 mm to 50 mm. n is the number of the loops 40 of the POF 20 which ranges from 2 to 10. The POF 20 is flexible and shaped as a series of extended loops 40. The POF 20 is attached on a flexible and elastic substrate 30. The POF 20 is notched on at least one side to form a notch 41 in the loop 40. The notches 41 may be V-shaped, rectangular or circular and any other regular or irregular shape. The shape and depth of the notches 41 can be accurately controlled.

The loops of the POF 20 can be fixed on the elastic substrate 30 by silicone glue, epoxy glue or the threads, or either two or all of them. An alternative method is to attach the POF 20 through a rotatable hinge with a hollow core where the POF 20 can go through and fix to the elastic substrate 30. Also, the strain sensor 12 can be attached to a surface of or embedded in flexible structures. The ends of the strain sensor 12 are connected to the LED 11 and the fiber optic power meter 13, respectively. The light power of the light transmitted through the notches 41 in the POF 20 can be detected by the fiber optic power meter 13.

The notch 41 in the POF 20 is used to increase the light power transmission loss, for improving sensitivity. When the strain sensor 12 is stretched, the curvature of the POF 20 is changed accordingly, and the shape of the notches 41 in the POF 20 is changed also. The change of light power depends on the alteration of the shape of the notches 41 under different strains applied to the POF 20. A reproducible relationship exists between the strain and the light power transmission loss through the notches 41.

In FIG. 3, the notches 41 can be made on the top (A) or the bottom (B) of each loop 40 to increase the sensitivity of the strain sensor 12.

Figure 4:
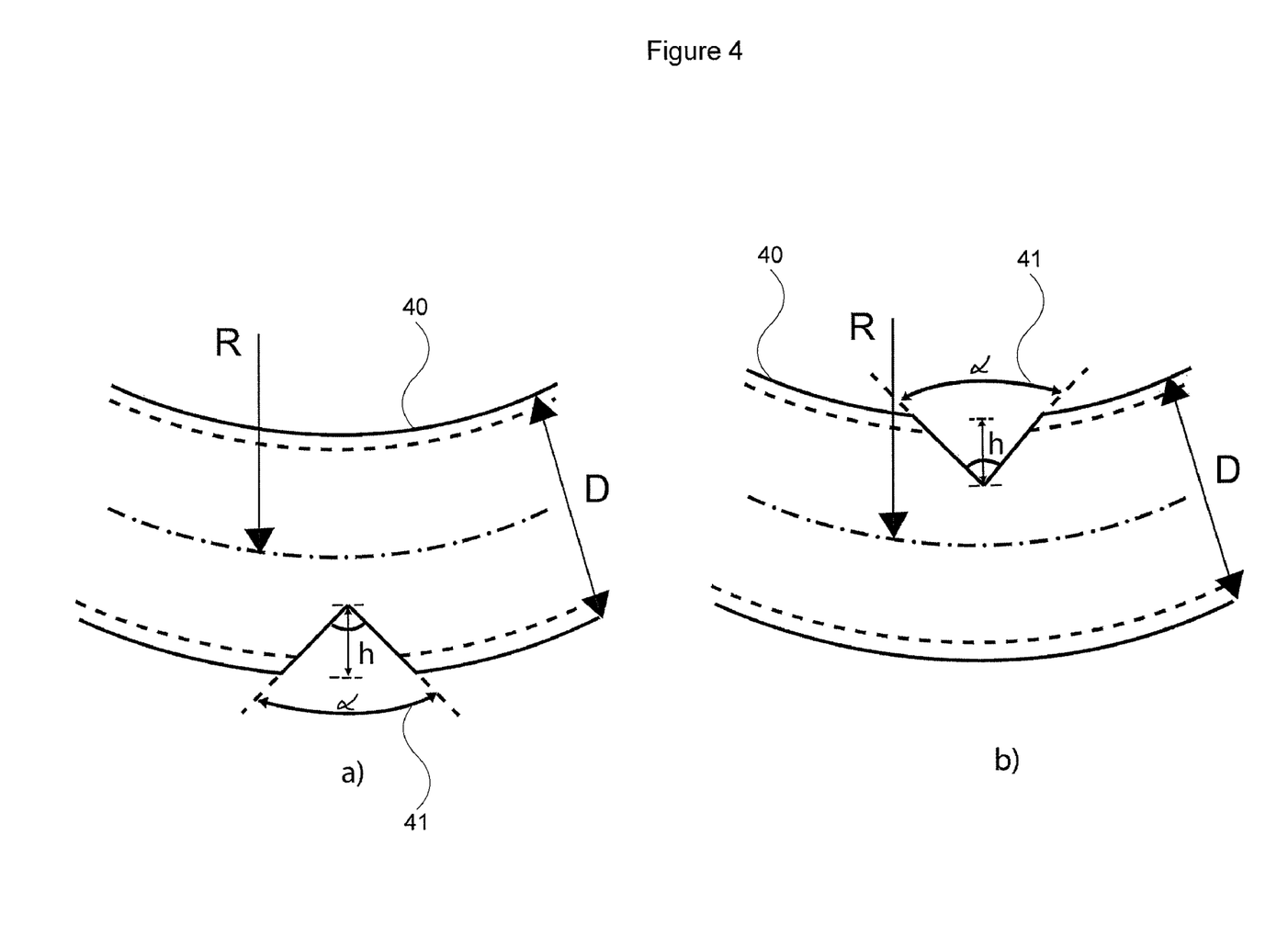
FIG. 4 is a zoomed-in side view of a POF sensor in accordance with an embodiment of the present invention.
Figure 5:
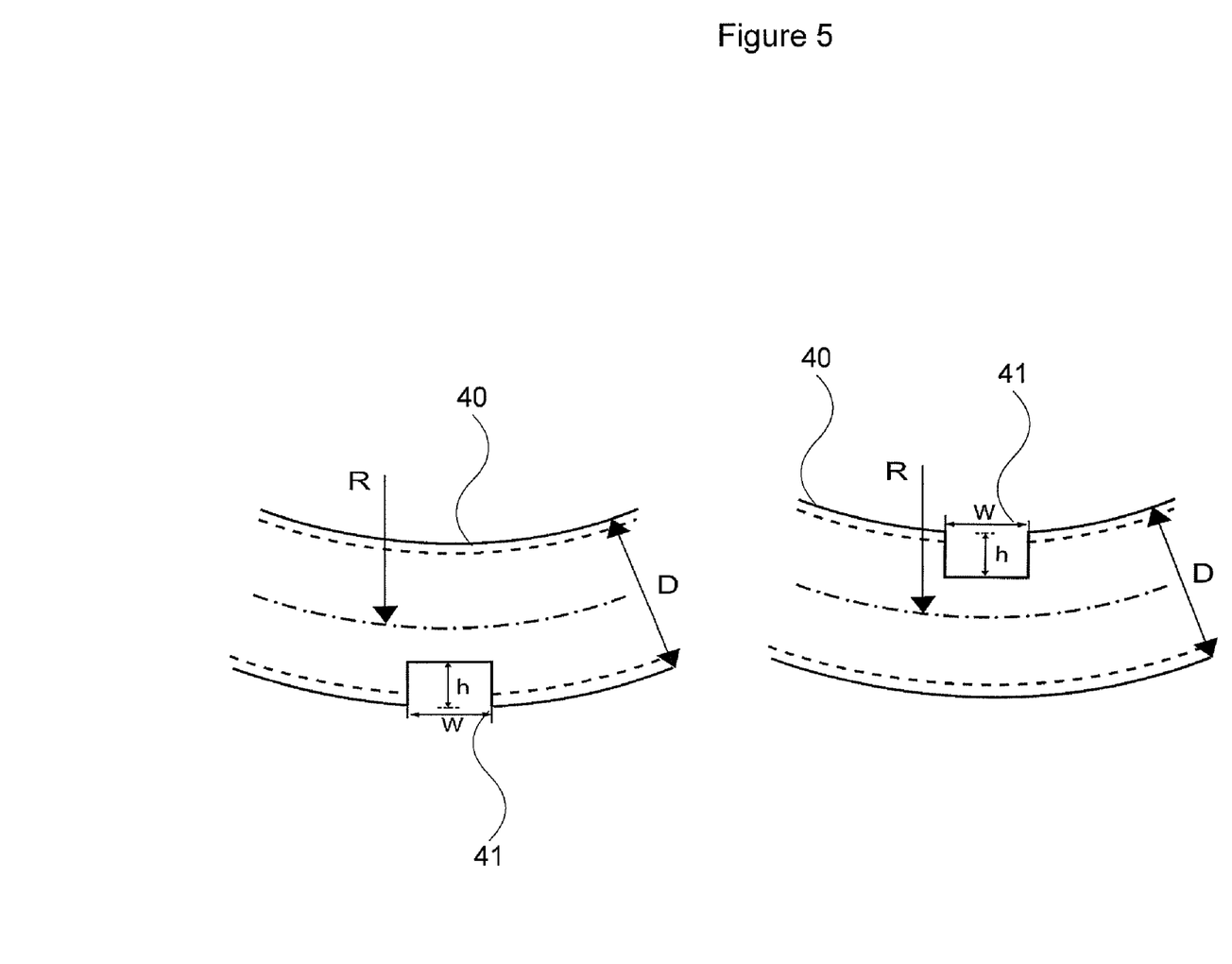
FIG. 5 is a zoomed-in side view of a POF sensor in accordance with an embodiment of the present invention.
Figure 6:
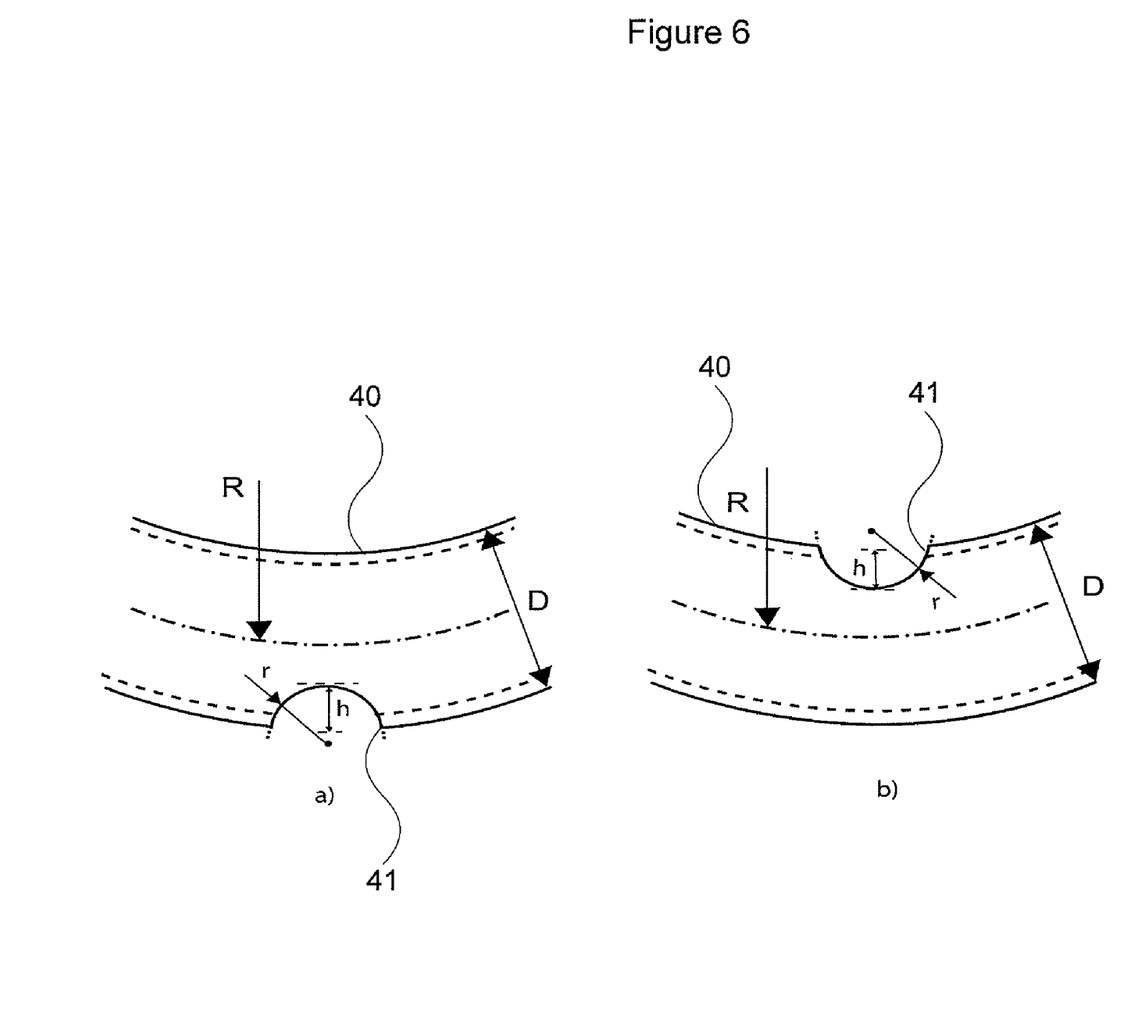
FIG. 6 is a zoomed-in side view of a POF sensor in accordance with an embodiment of the present invention.

Referring to FIGS. 4 to 6, various notches 41 are possible. A laser is used to form the notches 41 on the loops 40 of the POF 20 so that the shape and depth of the notches 41 can be accurately controlled The notches 41 can also be made on the POF 20 by laser ablation, electric beam, hot wire or mechanical cutting.

Referring to FIG. 4($a$), the notch 41 is formed on the convexity of the loop 40. In FIG. 4($b$), the notch 41 is on the concave of the loop. $\alpha$ is the angle of a V-shaped notch which ranges from 0° to 150°. h is the depth of the V-shaped notch 41 which ranges from 0.01 mm to D/2.

Referring to FIG. 5($a$) the notch 41 is formed on the convexity of the loop 40. In FIG. 5($b$), the notch 41 is on the concave of the loop 40. h is the depth of a rectangular notch 41 which ranges from 0.01 mm to D/2. w is the width of the rectangular notch 41 which ranges from 0.01 m to 2D.

Referring to FIG. 6($a$), the notch 41 is formed on the convexity of the loop 40. In FIG. 6($b$) the notch 41 is on the concave of the loop 40. r is the radius of a circular notch 41 which ranges from 0.01 m to D/2. h is the depth of the circular notch 41 which ranges from 0.01 mm to r.

The sensitivity of strain sensor 12 is affected by the presence of notches 41 on the loops 40 of the POF 20. Two types of strain sensors 12 are depicted in FIGS. 7 and 8.

Figure 7:
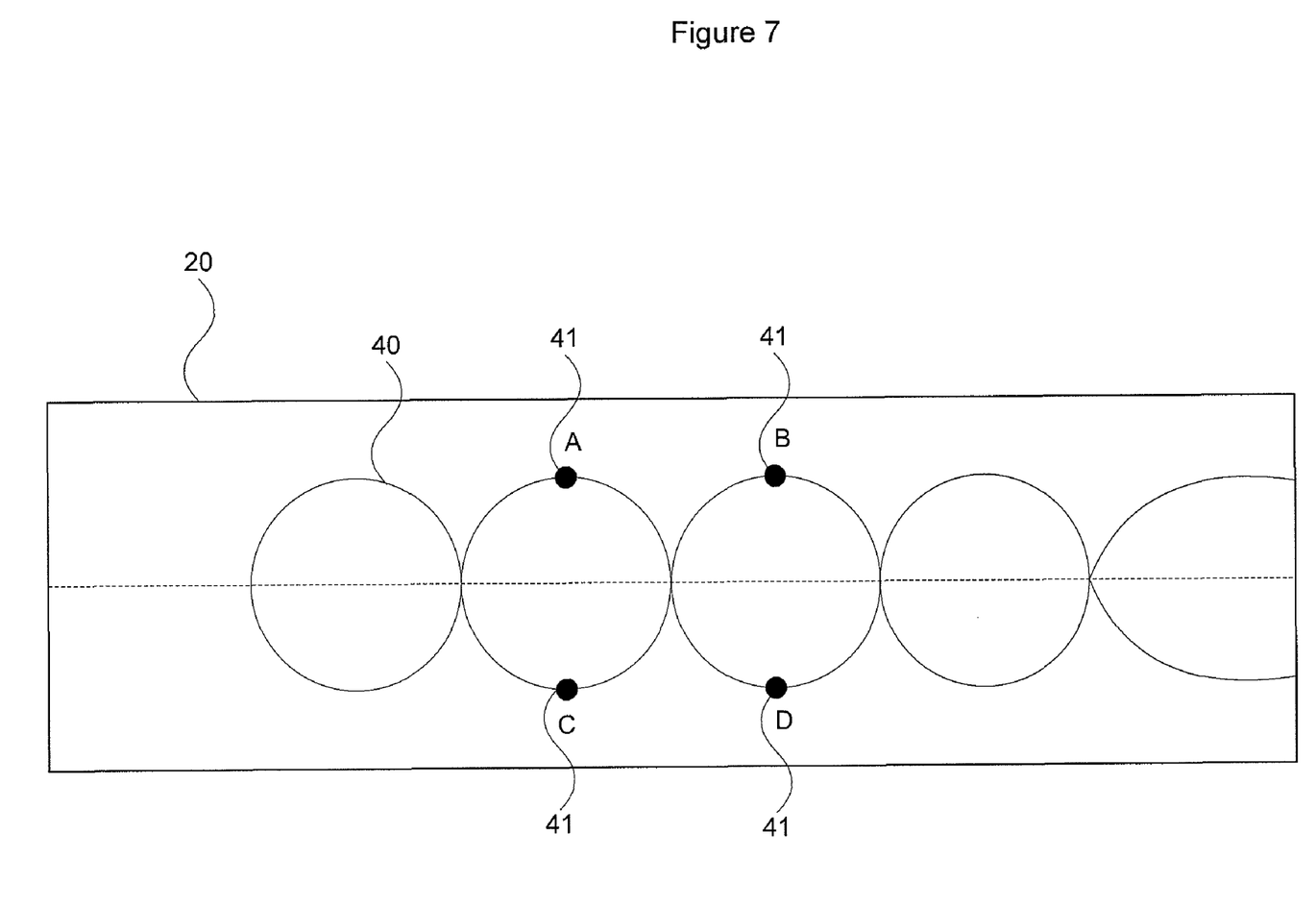
FIG. 7 is a side view of a POF sensor in accordance with an embodiment of the present invention.

Referring to FIG. 7, four circular notches 41 are made on the concave loop 40 at point A, B, C and D, respectively. The radius of the loop 40 is 1 cm and the diameter of the POF 20 is 500 μm.

Figure 8:
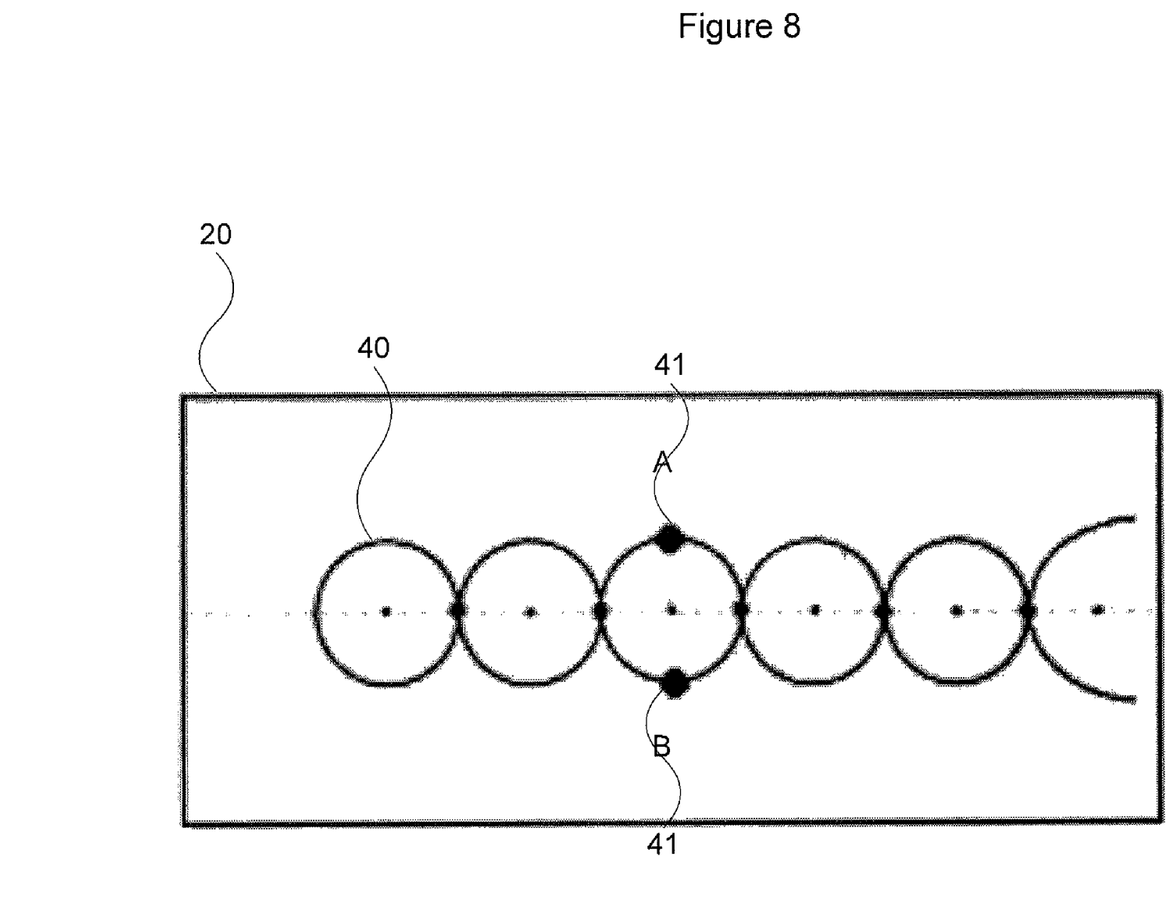
FIG. 8 is a side view of a POF sensor in accordance with an embodiment of the present invention.

Referring to FIG. 8, five loops 40 of the strain sensor 12 are depicted. The strain sensor has a height of 3 cm and length of 7 cm. Two circular notches 41 are made on the the on the convexity loop at point A and B, respectively. The radius of the loop 40 is 0.5 cm and the diameter of the POF is 250 μm.

The strain sensors 12 are fixed on a mechanical stretch system which is controlled by the computer 14. The strain deformation is from 0% to 30%. The change of light power is detected by the fiber optic power meter 13 and recorded by the computer 14. All the measurements are carried out in three cycles.

Figure 9:
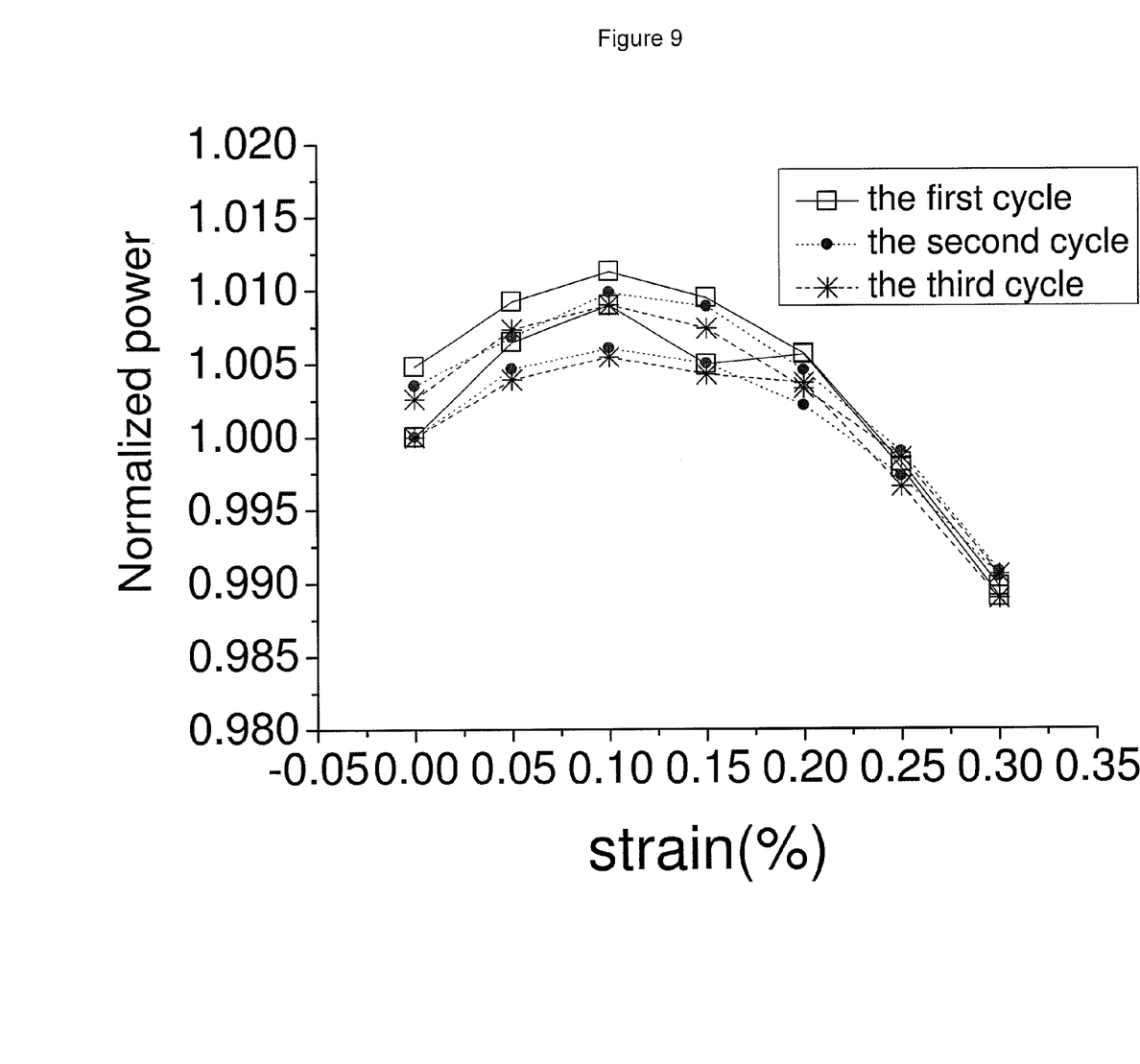
FIG. 9 is a chart of normalized calibration curves of the prior art POF sensor with four loops and without notches.

Referring to FIG. 9, the normalized calibration curve of a prior art four loops POF sensors without notches is depicted. There is little change in the light power when the strain sensor 12 is strained from 0% to 30% and the error rate is less than 1.5%. This change in light power is caused by the macrobending. The change in light power is too small to detect the deformation of the strain sensor.

Figure 10:
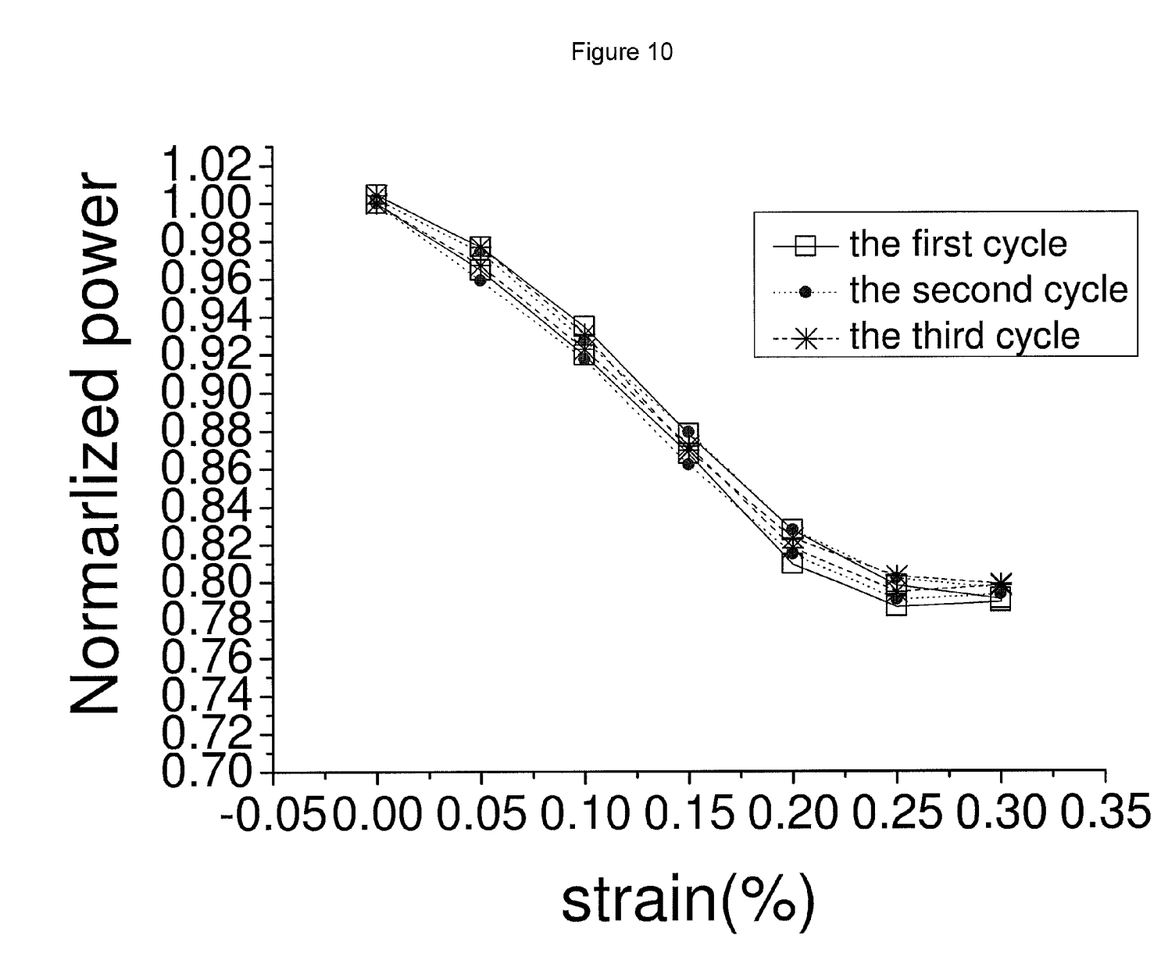
FIG. 10 is a chart of normalized calibration curves of three strain cycles of sensors with four notches.

Referring to FIG. 10, normalized calibration curves of three strain cycles of strain sensors 12 with four notches 41 that were notched is depicted. When the strain sensor 12 is stretched, the notches 41 on the concave loops are stretched larger, resulting in decreasing light power. The curves also showed that sensor 12 has high repeatability.

Figure 11:
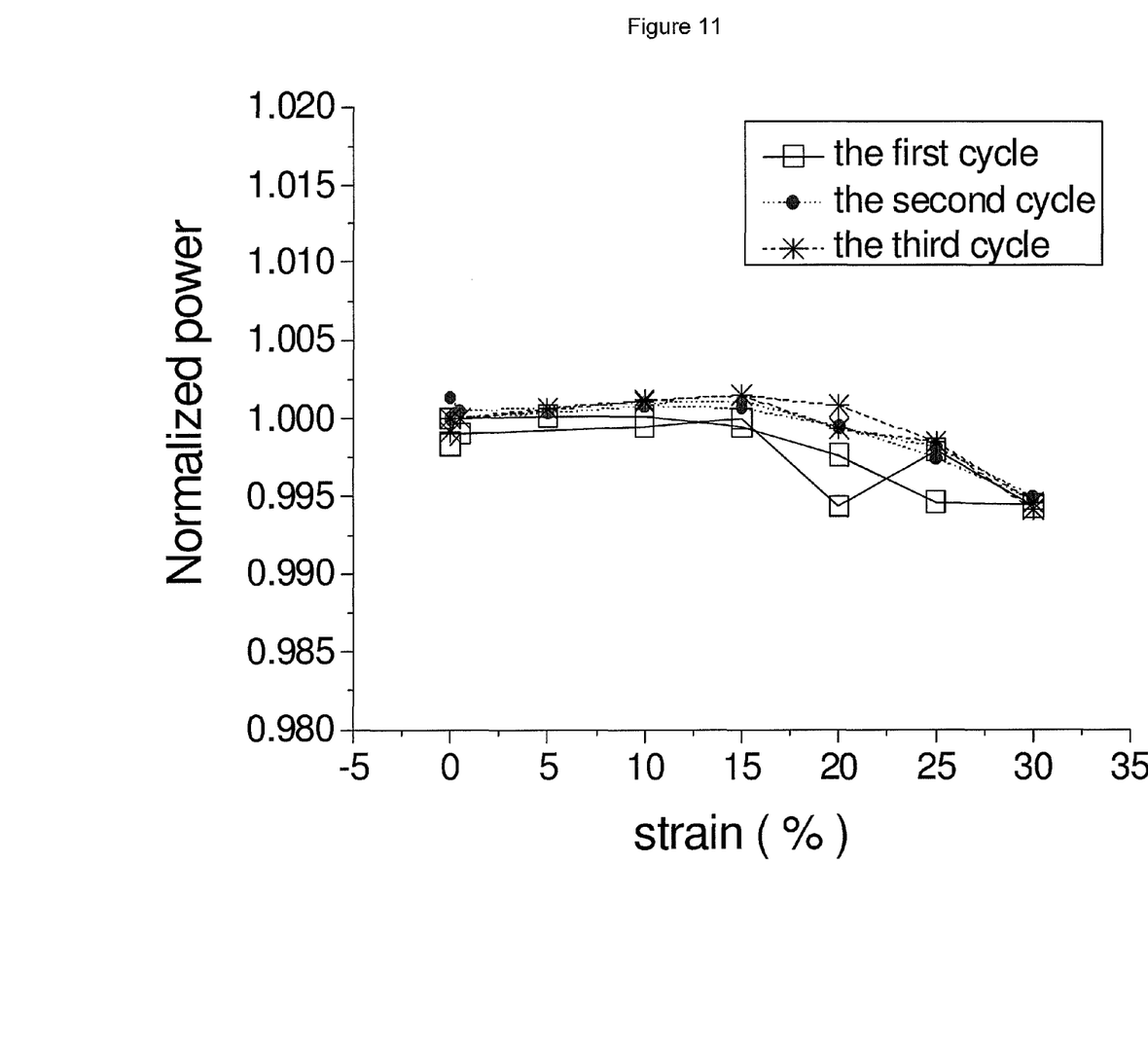
FIG. 11 is a chart of normalized calibration curves of prior art POF sensors with five loops and without notches.

Referring to FIG. 11, the normalized calibration curve of a prior art five loops POF sensors without notches is depicted. It can be seen that there is little change in the light power when the strain sensor is strained from 0% to 30% and the error rate is less than 1%.

Figure 12:
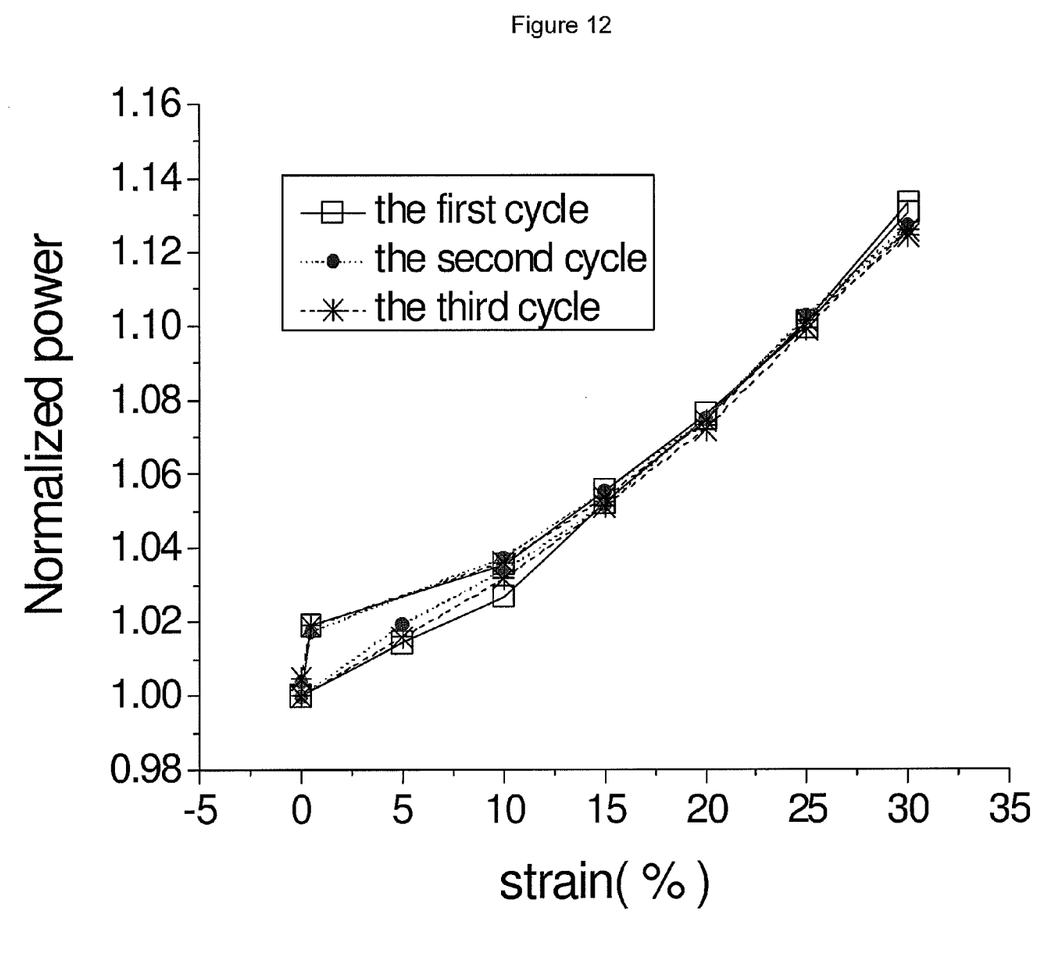
FIG. 12 is a chart normalized calibration curves of three strain cycles of sensors with two notches.

Referring to FIG. 12, normalized calibration curves of three strain cycles of strain sensors 12 with two notches 41 notched are depicted. When the strain sensor 12 is stretched, the notches 41 on the convexity loops are compressed to become narrower, resulting in increasing light power. The curves also showed that the strain sensor 12 has high repeatability.

The strain sensor 12 has a wide range of measurements and simplicity of design. Laser ablation is applied on the side of the optical fiber surface treatment to form notches 41 and increase the sensitivity of the strain sensor 12. The strain sensor 12 can detect strain in repeated large deformation up to 30%. The strain sensor 12 operates without electromagnetic interference. Power measurement is used instead of spectrum.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A fiber optical strain sensor for detecting repeated large deformation, the sensor comprising:
    a flexible polymer optical fiber (POE) in the form of a series of extended loops, the loops being flexible to allow rotation in the plane;
    notches formed on at least one side of the fiber;
    wherein the amount of strain applied on the strain sensor is measured by detecting a change of the light power transmission loss through the notches caused by the alteration of the shape of the notches when the strain sensor is strained.

2. The sensor according to claim 1, wherein the change in light power is detected by a photo-detector.

3. The sensor according to claim 1, wherein the quantity and the shape of the notches are related to axial strain of the sensor.

4. The sensor according to claim 1, wherein the notches are formed on the fiber by any one from the group consisting of: laser ablation, electric beam, hot wire and mechanical cutting.

5. The sensor according to claim 1, wherein the notches are formed on the top or bottom of each loop of the fiber.

6. The sensor according to claim 1, wherein the sensor is attached to an elastic substrate to detect strain applied on the elastic substrate, and the attachment is by any one from the group consisting of: silicon glue, epoxy glue, threads and any combination thereof.

7. The sensor according to claim 1, wherein the notches are "V" shaped, rectangular or circular.

8. The sensor according to claim 1, wherein the change of light power is an increase or decrease relative to the light power prior to the strain sensor being strained.

9. A measurement system for detecting repeated large deformation comprising:
    a fiber optical strain sensor including a flexible polymer optical fiber (POF) in the form of a series of extended loops, the loops being flexible to allow rotation in the plane; and notches formed on at least one side of the fiber;
    a light source connected to the POF; and
    a photo-detector to detect a change of the light power transmission loss through the notches caused by the alteration of the shape of the notches when the strain sensor is strained.

10. The system according to claim 9, wherein the strain sensor is attached to an elastic substrate.

11. The system according to claim 9, further comprising a computer to control the strain applied and display the light power, and to record the change of light power detected by the photo-detector.

12. The system according to claim 9, wherein the photo-detector is a fiber optic power meter.

13. A method for detecting repeated large deformation, the method comprising:
    detecting a change of the light power transmission loss through notches formed on at least one side of a flexible polymer optical fiber (POF) in the form of a series of extended loops where the loops being flexible to allow rotation in the plane;
    wherein the amount of strain applied on the strain sensor is measured by the detected change of the light power transmission loss through the notches caused by the alteration of the shape of the notches when the strain sensor is strained.

* * * * *